Feb. 6, 1951 C. C. YOUNG ET AL 2,540,924
STEAM COOKER
Filed March 31, 1947 4 Sheets-Sheet 1

INVENTORS.
Cyril Charles Young
Donald F. Troupe
BY
ATTORNEY

INVENTORS
Cyril Charles Young
Donald F. Troupe
BY
ATTORNEY

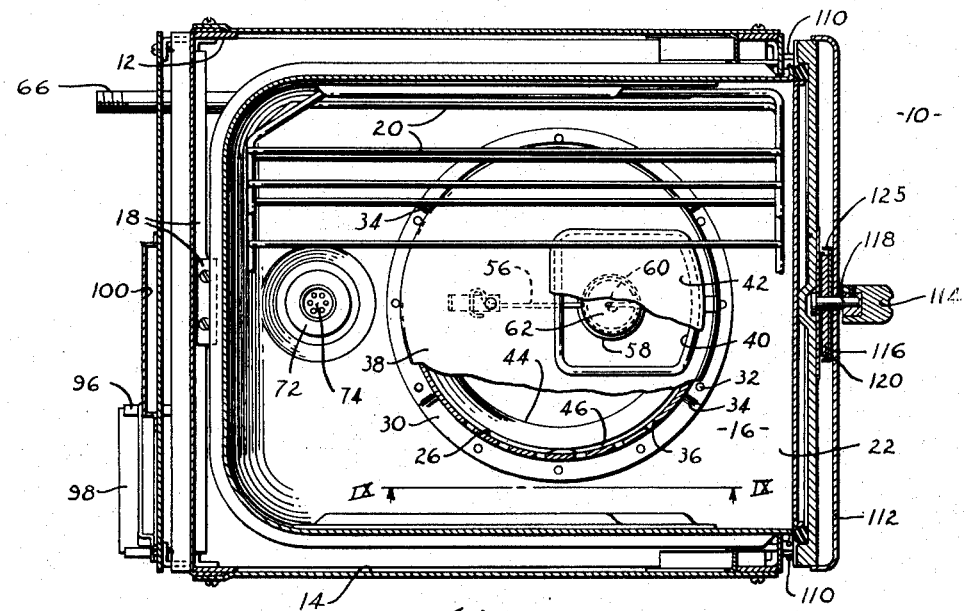
Fig. 3.
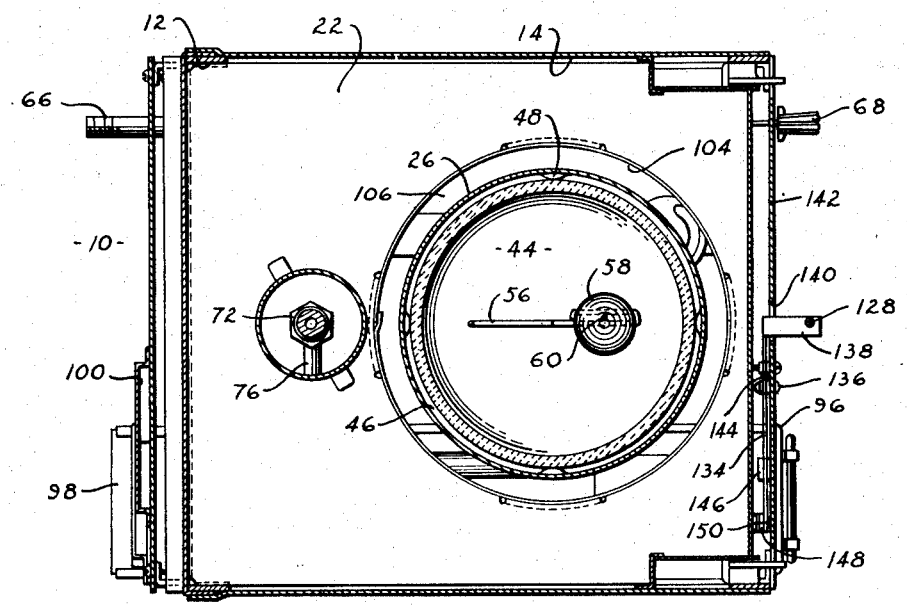
Fig. 4.
INVENTORS.
Cyril Charles Young
Donald F. Troupe
BY
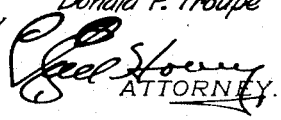
ATTORNEY.

Feb. 6, 1951     C. C. YOUNG ET AL     2,540,924
STEAM COOKER

Filed March 31, 1947     4 Sheets-Sheet 4

INVENTORS.
Cyril Charles Young
Donald F. Troupe
BY
ATTORNEY.

Patented Feb. 6, 1951

2,540,924

UNITED STATES PATENT OFFICE 2,540,924

STEAM COOKER

Cyril Charles Young and Donald F. Troupe, Kansas City, Mo., assignors to The Vendo Company, Kansas City, Mo., a corporation of Missouri Application March 31, 1947, Serial No. 738,478

4 Claims. (Cl. 126—20)

1

This invention relates to food processing appliances of the kind particularly adapted for domestic or small operator use and has for its primary aim the provision of cooking equipment having means for treating food products, and particularly those requiring moist heat, through the application of steam.

The most important object of this invention is to provide a steam cooker having a steam cooking compartment and a steam generating boiler in communication therewith so formed as to move live steam generated from fresh water in the steam generating boiler into the cooking compartment under pressure.

Another important object of this invention is to provide a steam cooker having means for maintaining steam within a cooking compartment under pressure and structure for controlling not only the amount of pressure in the compartment but also the temperature therein.

A further object of this invention is to provide a steam cooker having a cooking compartment provided with an opening in a normally bottom wall thereof within which opening is mounted a steam generating assembly in communication with the compartment, said assembly comprising a boiler and a reservoir loosely disposed within the boiler, the reservoir supplying water to the boiler for conversion into steam.

A still further object of this invention is to provide in a steam boiler having the aforesaid steam generating assembly as a part thereof, a reservoir of ceramic material mounted within the boiler and having its walls spaced from the walls of the boiler to provide a space surrounding the reservoir creating a thin film of water for quick conversion into steam, the boiler and reservoir being placed into mutual communication by openings in the side walls of the said reservoir.

Another object of this invention is the provision of a steam cooker having a cooking compartment and reservoir extending thereinto, said reservoir having an open top, a number of openings in that portion thereof extending into the compartment and closure overlapping said openings to avoid exchange of flavors among the foods during the cooking process.

A further object of this invention is to provide a steam cooker in the nature of that above described wherein said cooking compartment is provided with a swingable door having an unique latching mechanism operable to vent all steam from the compartment before the door is opened and upon manipulation of the said latch.

A still further object of this invention is the

2 provision of a steam cooker having a pressure valve for automatically venting the cooking compartments, said valve being also operable by the aforesaid latching assembly to completely evacuate the compartment prior to opening its door.

Other objects of this invention include the manner in which combustion gases emanating from the heating burner for the steam generating assembly are directed to a flue in such manner as to surround both the reservoir and the cooking compartment; the way in which air, condensed steam, vapors and excess steam are evacuated from the cooking compartment into a specially formed condensate pan and thence into the flue; and the manner in which the entire assembly, including not only the way in which the said compartment is evacuated but the way in which fresh live steam is directed into the compartment, serves to permit cooking of any number of different types of foods simultaneously without danger or intermixing of odors and flavors of such foods.

Many additional objects will be made clear or become apparent during the course of the following specification, reference being had to the accompanying drawings wherein:

Fig. 3 is a cross-sectional view taken on line III—III of Fig. 2.

Fig. 4 is a cross-sectional view taken on line IV—IV of Fig. 2.

Figure 1:
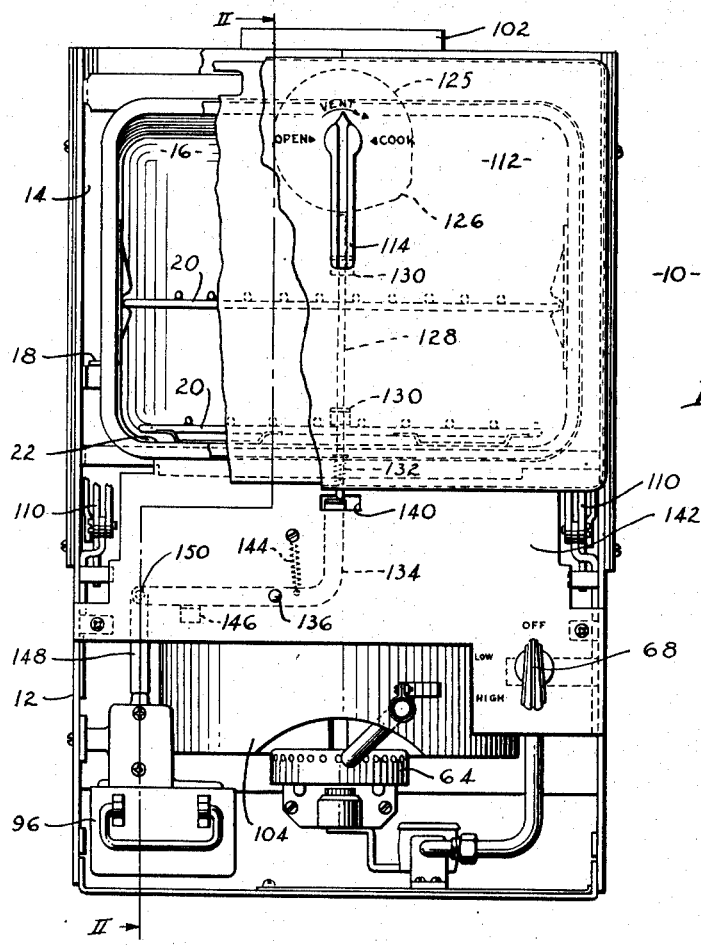
Figure 1 is a front elevational view of a steam cooker made in accordance with our present invention, parts being broken away for clearness.
Figure 8:
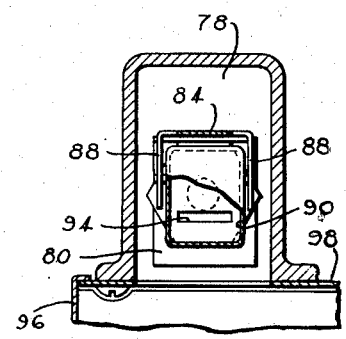
Fig. 8 is a fragmentary cross-sectional view taken on line VIII—VIII of Fig. 7 looking in the direction of the arrows and Fig. 9 is an enlarged fragmentary elevational view of the steam generating reservoir per se.
Figure 7:
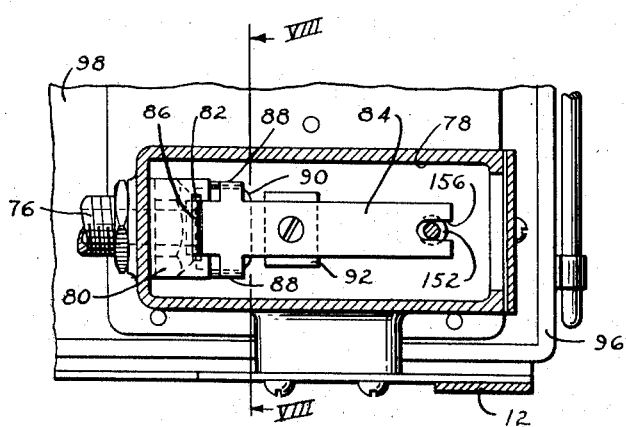
Fig. 7 is a fragmentary detailed cross-sectional view taken on line VII—VII of Fig. 2 on an enlarged scale.

Many devices have heretofore been made adaptable to process food by the application of steam but such devices having automatic means for controlling both temperature and pressure have been impractical for home use or by small establishments. The steam cooker about to be described not only embodies these features but provides an assembly of parts for simplifying cooking of foods requiring moist heat, which cooker is simple to operate, requires little attention, maintains a certainty of uniform results and is adaptable not only for preparing foods in open containers but usable as a sterilizer and particularly adaptable for canning.

In the drawings wherein like reference numerals refer to like parts throughout the drawings, the numeral 10 designates broadly a cabinet having framework 12 for supporting all the component parts of the steam cooker about to be described. A chamber 14 carried by this framework 12 has mounted therein a compartment broadly designated by the numeral 16. This compartment 16 is somewhat smaller than the chamber 14 as clearly illustrated in Figs. 1 to 5 inclusive and suitable brackets 18 on the walls of chamber 14 and compartment 16 respectively serve to removably support the latter. This compartment 16 comprises the steam cooking chamber and is provided with a number of horizontally disposed racks 20 in the usual manner. The normally bottom wall 22 of the compartment 16 is provided with an opening 24 near one end thereof within which is mounted a hollow boiler 26. This boiler 26 has an open top and an annular outwardly extending flange 28 overlapping the opening 24 in wall 22 when this boiler 26 is mounted within opening 24.

Figure 9:
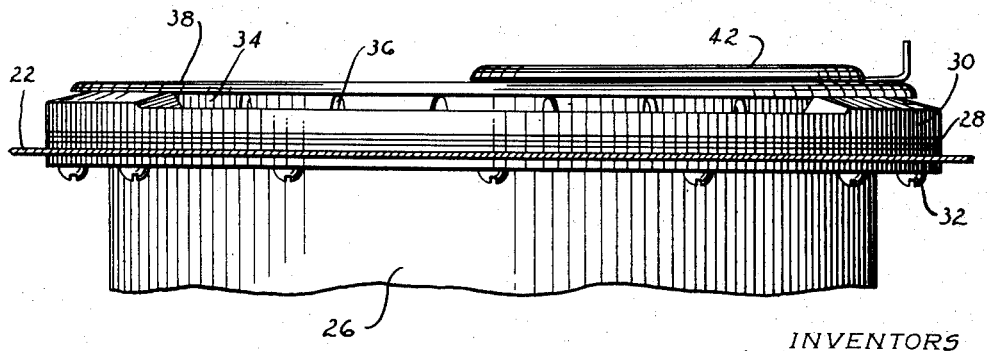
Figure 5:
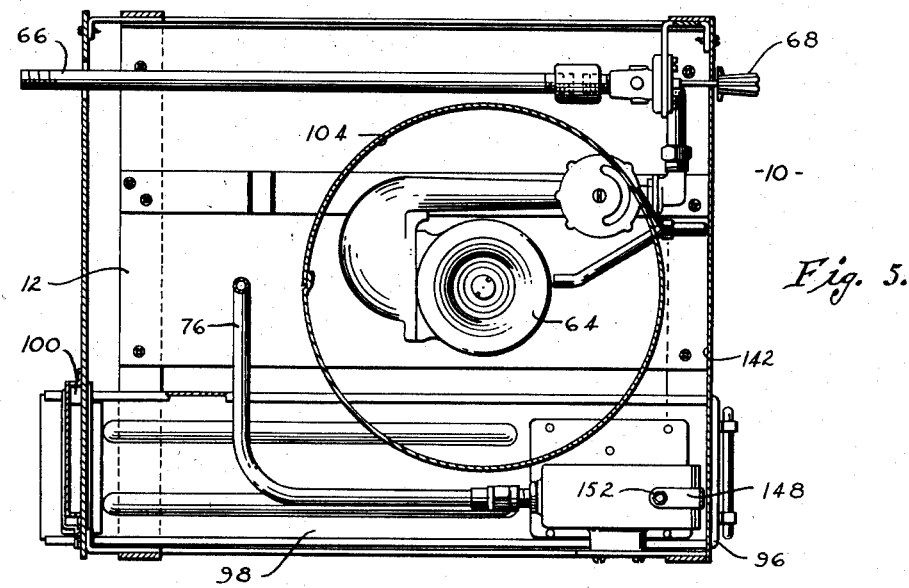
Fig. 5 is a cross-sectional view taken on line V—V of Fig. 2.

A ring 30 defines the open top of this boiler 26 and a number of bolts or the like 32 pass upwardly through bottom wall 22, flange 28 and into the ring 30 for securing the boiler 26 to the compartment 16. A portion of the upper-most edge of this ring 30 has a pair of cut-out portions 34 within which are formed a plurality of openings 36 for placing the boiler 26 into direct communication with a compartment 16. A closure 38 for boiler 26 overlies the cavities 34 and the openings 36 as illustrated in Fig. 9 and this closure 38 has an opening 40 therein closed by a lid 42.

Loosely disposed within the boiler 26 is a hollow reservoir 44 formed preferably from ceramic material. The cross-sectional area of this reservoir 44 is less than the inner-most cross-sectional area of the boiler 26 to present a relatively thin space circumscribing the reservoir 44 as at 46. This space 46 is maintained and the reservoir 44 held out of contact with the walls of the boiler 26 by a number of indentations 48 embossed in the boiler 26. These bosses 48 are also formed in the bottom wall 50 of boiler 26 to hold the reservoir 44 upwardly out of engagement with this bottom wall 50 to the end that the thin space 46 completely surrounds the reservoir 44, all as is clear in Figs. 2, 4 and 6. The reservoir 44 is placed into communication with a boiler 26 by a number of openings 52 formed in the reservoir 44 and near the bottom wall thereof. This reservoir 44 is adapted to contain a filling of water 54 which is free to flow from reservoir 44 through openings 52 into the space 46 of boiler 26, thereby creating a thin film of water surrounding the reservoir 44.

Figure 2:
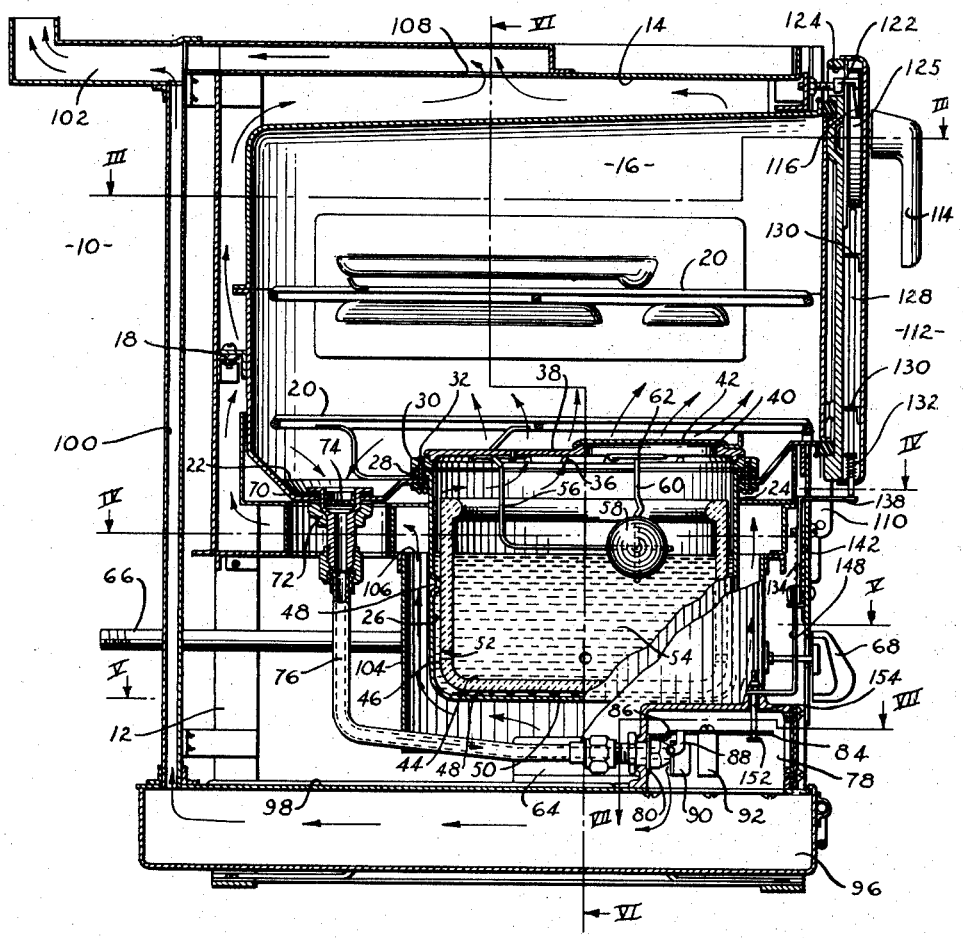
Fig. 2 is a cross-sectional view taken on broken line II—II of Fig. 1 looking in the direction of the arrows.
Figure 6:
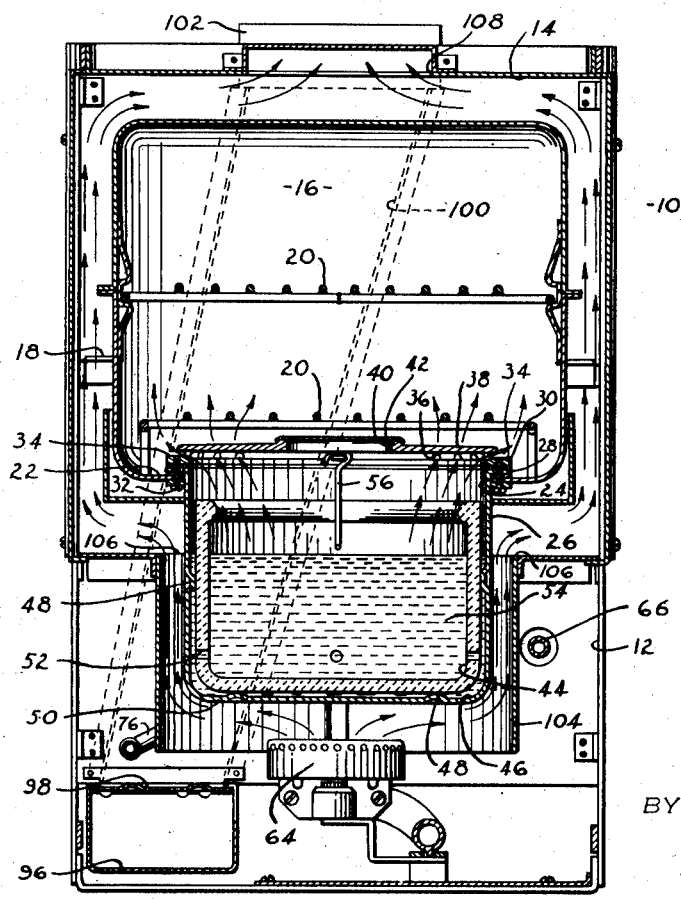
Fig. 6 is a cross-sectional view taken on line VI—VI of Fig. 2 and looking in the direction of the arrows.

An L-shaped arm 56 is swingably carried within the reservoir 44 by the closure 38 and a float 58 is mounted upon the free end of this arm 56. This float 58 carries an upstanding wire 60 having a flat plate 62 on the uppermost end thereof and adjacent to the opening 40 in the closure 38 when the level of the water 54 is as illustrated in Figs. 2 and 6. Removal of the lid 42 makes it possible for the operator to determine whether or not there is sufficient water within the reservoir 44 by merely viewing the position of plate 62.

A fuel consuming burner 64 underlies the boiler 26 and has a pipe 66 leading to a suitable source of fuel supply (not shown) and a control valve 68 suitably mounted on the face of cabinet 10 where the same is accessible to the operator.

Wall 22 of compartment 16 is provided with a second somewhat smaller opening 70 within which is mounted a fitting 72 for receiving a filtering cup 74 and one end of a conduit 76. This conduit 76 terminates below the boiler 26 and to one side of the burner 64 and is in communication with a chamber 78. A bracket 80 within the chamber 78 is slotted as at 82 for receiving one end of an arm 84 which end of arm 84 is off-set as at 86. A pair of legs 88 on the arm 84 carries a cap 90 for movement to and from a position closing the end of conduit 76 extending into the chamber 78. A weight 92 secured to the arm 84 intermediate its ends serves to maintain cap 90 against the open end of conduit 76 where the same is closed. Thus it is clear that as the steam within compartment 16 reaches a predetermined pressure, the same will pass outwardly through the conduit 76 and actuate the cap 90 against the action of the weight 92 whereby the steam is free to escape. Upon such movement of cap 90 outwardly from the conduit 76, the escaping steam will pass through an elongated slot 94 formed in the cap 90 to create a whistling sound and thereby notify the operator that such steam is escaping. This cap 90 is hollow and has a flat plate covering the open end of conduit 76 and it is in this plate that slot 94 is formed. The operator may then adjust the burner 64 by manipulation of valve 68 to lessen the amount of steam passing from boiler 26 into the compartment 16.

The small chamber 78 is open at its bottom to communicate with an elongated condensate pan 96 slidable on a top plate 98 mounted on the frame 12. One end of this condensate pin 96 opposite to the chamber 78 is in communication with a venting flue 100 for the vapors or other condensate materials and this flue 100 is in turn in communication with a gas flue 102 at its upper-most end. A jacket 104 completely surrounds the boiler 26 in spaced relation thereto and this jacket 104 depends from and is mounted upon the lower-most wall of the chamber 14. This jacket 104 is in communication with the chamber 14 as at 106 and extends downwardly and around the burner 64. Chamber 14 has an outlet opening 108 into the flue 102 and it is clear that the burned gases emanating from the burner 64 will pass upwardly into jacket 104, chamber 14 and into the flue 102. The path of travel of these gases is clearly illustrated by arrows in Figs. 2 and 6 showing the way in which these hot vapors completely surround the boiler 26 as well as the compartment 16. This feature serves to fully utilize all the heat from the fuel used by burner 64 in heating not only boiler 26 but compartment 16.

The frame 12 has swingably mounted thereon, through the medium of a suitable hinge assembly 110, a door broadly designated by the numeral 112. This door 112 is sectional and has mounted therein a latch assembly designed to not only hold door 112 in the closed position as illustrated in Figs. 1, 2 and 3 but to actuate the pressure valve above described disposed within the chamber 78. This latch assembly includes an exteriorly mounted handle 114 which extends into the interior of door 112 and joins with a disc 116 through the medium of a stub shaft 118. This disc 116 has a groove 120 formed on one edge thereof to cooperate with a hook 122 on frame 12 in holding door 112 in the closed position. Door 112 is provided with an opening 124 for receiving the hook 122 when the door is closed whereby the hook 122 is disposed in the path of travel of the disc 116. The groove 120 of disc 116 only partially circumscribes the periphery of member 116 to the end that when handle 114 is swung to the "open" position illustrated in Fig. 1, the cam member 116 and the hook 122 are disengaged, permitting opening of door 112. The shaft 118 carries a plate like cam 125 within which is disposed the disc 116. This cam is substantially circular and is extended as at 126 to engage and actuate reciprocable rod 128 within the door 112 when the handle 114 is swung to the "vent" position illustrated in Fig. 1. This rod 128 is vertically disposed and slidably mounted in a pair of brackets 130 fixed within door 112. Rod 128 extends downwardly through an opening in the bottom wall of door 112 and a spring 132 yieldably maintains rod 128 at the upper-most end of its path of travel.

An L-shaped link 134 is pivotally secured to a plate 142 as at 136 and this link 134 has a projection 138 extending outwardly through a slot 140 formed in the face plate 142 of the cabinet 10. This projection 138 directly underlies the lower-most end of rod 128 projecting outwardly from door 112. A spring 144 yieldably maintains link 134 in the position illustrated in Fig. 1 where extension 138 is in contact with rod 128 and where one leg of link 134 opposite to the leg thereof having extension 138 thereon rests upon a bracket 146 mounted upon the inner-most face of plate 142. An L-shaped link 148 has one end of one leg thereof pivotally secured to the free end of link 134 as at 150. The other leg of this link 148 extends to overlying relationship with the chamber 78 and a pin 152 slidably mounted in an opening 154 in chamber 78 passes through an opening in link 148 and into a slot 156 in arm 84 to interconnect the same.

It is clear therefore that when handle 114 is in the "vent" position, projection 126 of cam member 125 will contact the rod 128 to actuate links 134 and 138 and the links will thereby pull pin 152 upwardly to move cap 90 to the open position with respect to the conduit 76.

In all other positions of handle 114, namely the "open" or the "cook" position, the projection 126 of cam 125 will be out of engagement with the rod 128 and the cap 90 will thereby be free to be actuated by excess steam from compartment 16. This is made possible by the sliding relationship with respect to arm 84 and pin 152 within slot 156.

It is clear from the foregoing that the steam cooker just described is virtually automatic in all respects. When the burner 64 is lighted, steam will be generated quickly within the thin chamber 46 to pass upwardly under pressure through the openings 36 and into the chamber 16. Upon a predetermined amount of excess pressure in compartment 16 valve 90 will automatically open and such excess pressure will flow into condensate pan 96 and thence into flues 100 and 102 respectively. When the whistling sound, made by passage of steam into slot 94 and thence into cap 90, is heard, the operator simply actuates valve 68 to decrease the amount of heat in burner 64.

After the cooking process has been completed the operator actuates handle 114 to move the same from the "cook" position to the "vent" position. All steam within compartment 16 is then evacuated into condensate pan 96. Upon further movement of handle 114 to the "open" position, the door 112 may be opened and there will be no out-rush of steam from compartment 16 to strike the operator.

Manifestly many changes and modifications may be made in the steam cooker forming the subject matter of this application, particularly in the details of construction without departing from the spirit of this invention or scope of the appended claims.

Having thus described the invention, what is claimed as new and desired to be secured by Letters Patent is:

1. In a steam cooker having a frame provided with a steam cooking compartment having an access opening in one side thereof, a closure for said opening shiftable to and from the closed position, and steam generating means for the compartment; a pressure actuated valve for governing the flow of steam or condensate from the compartment; a manually operable latch shiftable in one direction to a position where the closure is locked in a shut condition; and linkage shiftable to and from a position opening the pressure valve, said latch having a part engageable with the said linkage after the closure is locked shut, and upon further movement of the latch in said one direction, to shift the linkage to said position where the valve is opened and said compartment is evacuated.

2. In a steam cooker having a frame provided with a steam cooking compartment having an access opening in one side thereof, a closure for said opening shiftable to and from the closed position, and steam generating means for the compartment; a pressure actuated valve for governing the flow of steam or condensate from the compartment; a manually operable latch shiftable in one direction to a position where the closure is locked in a shut condition; linkage shiftable to and from a position opening the pressure valve, said latch having a part engageable with the said linkage after the closure is locked shut, and upon further movement of the latch in said one direction, to shift the linkage to said position where the valve is opened and said compartment is evacuated; and yieldable means for holding the valve in a normally closed condition, said linkage being inoperable when said latch is shifted to an unlocked position.

3. In a steam cooker having a frame provided with a steam cooking compartment having an access opening in one side thereof, a closure for said opening shiftable to and from the closed position, and steam generating means for the compartment; a pressure actuated valve for governing the flow of steam or condensate from the compartment; a latch having parts on the closure and parts on the frame, certain of said parts on the closure being manually movable through a path of travel during the first portion whereof said certain parts on the closure interconnect with certain of the parts on the frame to hold the closure shut, said certain parts on the closure being formed to engage and actuate other parts on the closure and frame respectively as the latch is moved through the last portion of its path of travel, said other parts on the frame being disposed to engage and open the valve to exhaust the compartment when the former are actuated.

4. In a steam cooker, a normally-closed steam cooking compartment having a bottom wall provided with an opening; a steam generating boiler provided with a top wall in said compartment and mounted in said opening in depending relationship to said bottom wall, there being a plurality of steam outlet openings in the sides of said boiler below said top wall and spaced above said bottom wall; and a valved outlet passageway for excess steam and condensate emanating from said steam compartment, said passageway registering with said bottom wall in a plane below the outlet openings of said boiler.

CYRIL CHARLES YOUNG.
DONALD F. TROUPE.

REFERENCES CITED

The following references are of record in the file of this patent:

UNITED STATES PATENTS

| Number | Name | Date |
|---|---|---|
| 692,516 | Higgins | Feb. 4, 1902 |
| 862,443 | Bruck | Aug. 6, 1907 |
| 1,344,326 | Williams | June 22, 1920 |
| 1,421,425 | Duncan | July 4, 1922 |
| 1,628,895 | McKenna | May 17, 1927 |
| 1,814,122 | Bryson | July 14, 1931 |
| 2,069,693 | Barrett | Feb. 2, 1937 |

FOREIGN PATENTS

| Number | Country | Date |
|---|---|---|
| 6,854 | Great Britain | May 3, 1890 |
| 17,864 | Austria | Oct. 10, 1904 |
| 199,644 | Great Britain | Sept. 19, 1922 |
| 510,608 | Great Britain | Feb. 3, 1938 |